Figure 2A:
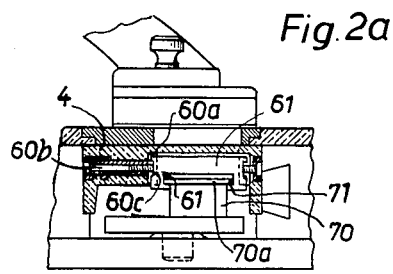

March 1, 1966  R. THEILER  3,237,368
MACHINES FOR THE PRODUCTION AND PACKING
OF CAKES OF KNEADABLE MATERIAL
Filed Oct. 5, 1962  4 Sheets-Sheet 1
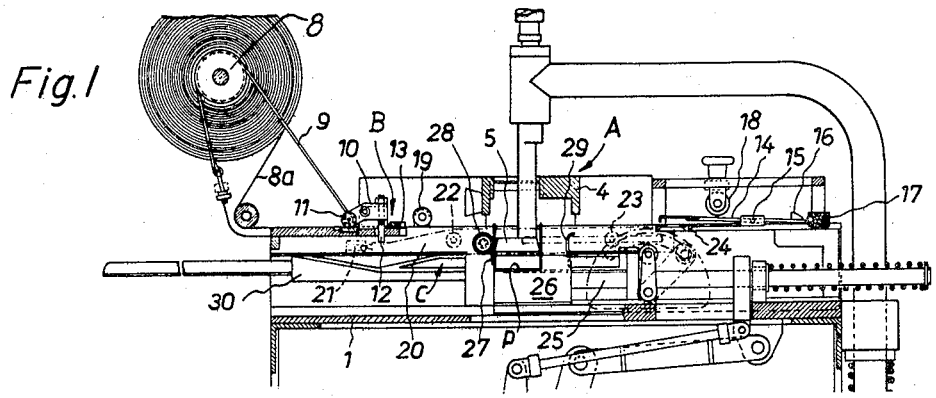
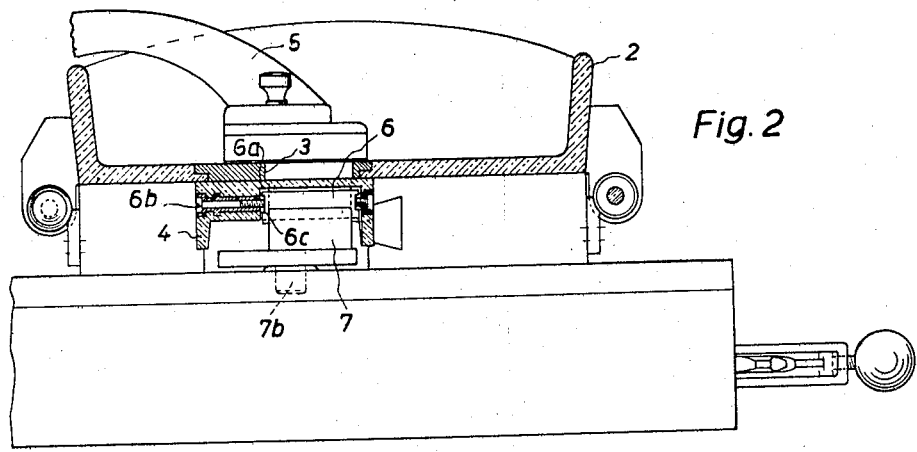
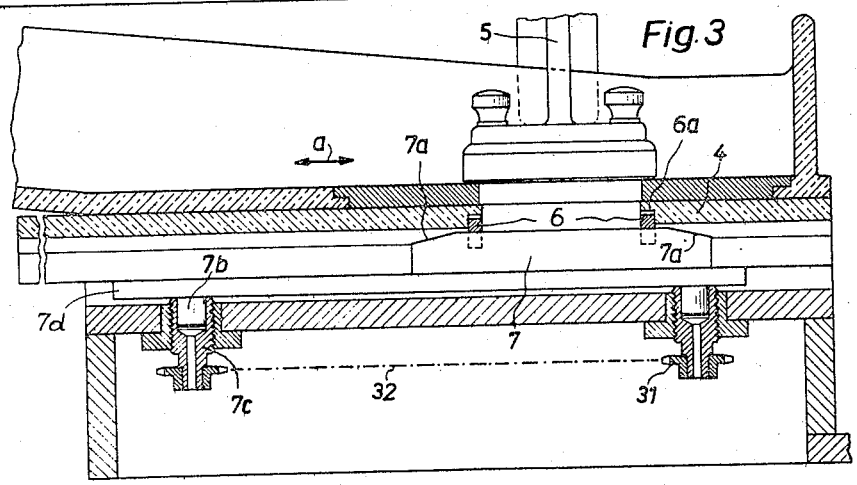
Robert Theiler, Inventor
By Wenderoth, Lind and Ponack
Attorneys March 1, 1966  R. THEILER  3,237,368
MACHINES FOR THE PRODUCTION AND PACKING
OF CAKES OF KNEADABLE MATERIAL
Filed Oct. 5, 1962  4 Sheets-Sheet 2

Robert Theiler Inventor
By Wenderoth Lind
and Ponack, Attorneys

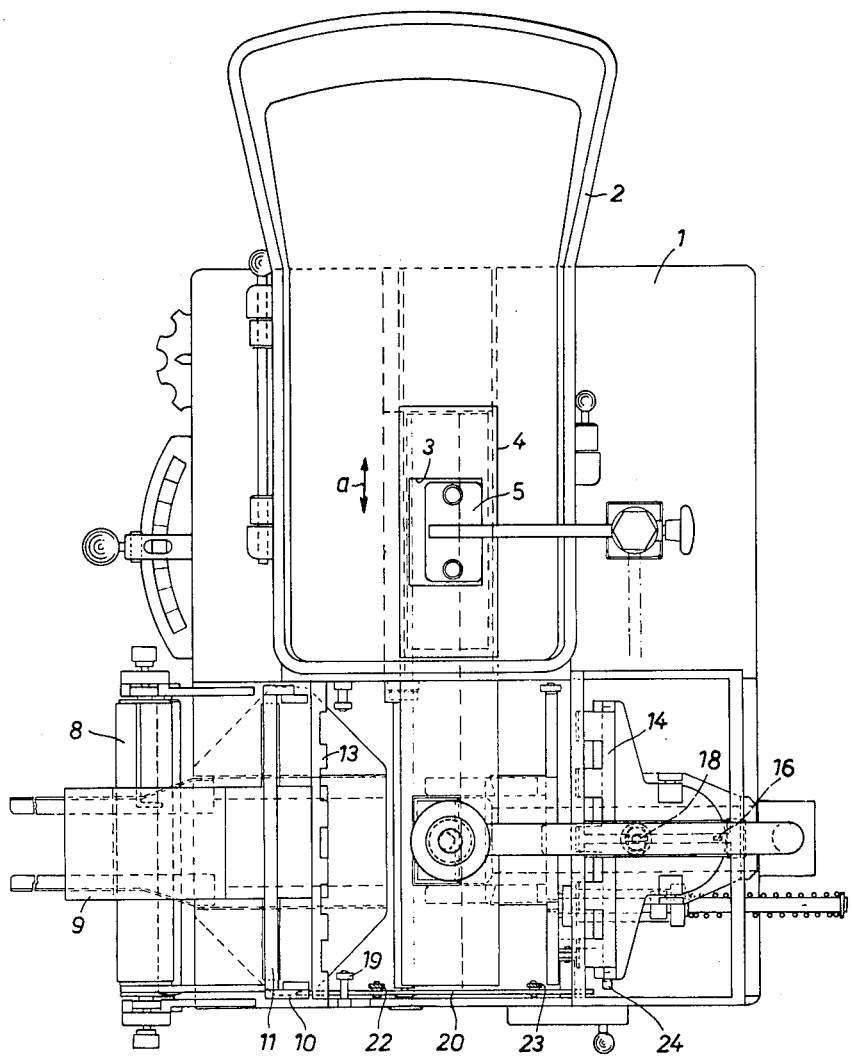

March 1, 1966   R. THEILER   3,237,368
MACHINES FOR THE PRODUCTION AND PACKING
OF CAKES OF KNEADABLE MATERIAL
Filed Oct. 5, 1962   4 Sheets-Sheet 4

Robert Theiler, Inventor
By Wenderoth, Lind and Ponack
Attorneys

United States Patent Office 3,237,368
Patented Mar. 1, 1966

3,237,368
MACHINES FOR THE PRODUCTION AND PACKING OF CAKES OF KNEADABLE MATERIAL
Robert Theiler, Wohlen, Switzerland, assignor to Alofin Verwaltungs- & Finanzierungs - Aktiengesellschaft, Zurich, Switzerland
Filed Oct. 5, 1962, Ser. No. 228,635
Claims priority, application Switzerland, Oct. 5, 1961, 11,550/61; May 23, 1962, 6,235/62
12 Claims. (Cl. 53—122)

The present invention relates to a machine for the production and wrapping of cakes of kneadable material of the type comprising a device for filling the material into a mould and means for vertically discharging moulded cakes from the mould, a device for horizontally feeding wrapping or packing material into the discharge path of moulded cakes, and a wrapping device including a horizontal movable slider.

Machines of this type have already been proposed in which the slider of the wrapping or packing device, in addition to a back wall and a bottom, has a front wall facing the point of discharge of moulded cakes of the machine so that the slider will form a box open only on the top and the side. When the cake is discharged from the mould, it must then be introduced into the slide box by carrying along at the same time a sheet of wrapping material aligned with the lower mould opening. Since the first folding operations for wrapping the cakes into the packing sheet (U-shaped folding of the sheet around the cake and folding down the upstanding side flaps of the front and rear portion of the sheet on the upper surface of the cake) require the presence of parallel slider walls spaced from each other for a distance corresponding to the length of a cake, but since, on the other hand, a certain clearance between cake and slider walls is necessary to be able to introduce the cake together with the packing sheet into the slider box, the front wall in these known machines had to be pivotally arranged in such a way that the front wall was caused to swing into its vertical operating position only after the introduction of the cake and, at the same time, it was brought to abut against the cake wrapped in the packing sheet. After the passage of the last packing station (where the side flaps of the packing sheet were folded), the front slider wall had to be swung down completely to make it possible for the ready-packed cake to be discharged from the slider. This construction of such a slider is rather complex and susceptible to trouble. The object of the present invention is the provision of a machine which avoids this disadvantage.

According to the invention the slider of the packing device is formed by a bottom wall and a back wall, while a front wall of a cake receiving box of the slider, necessary for the first packing operation, is formed of a ledge tangentially protruding from a stationary, but rotatable guide roller, which ledge, in its active position during the first packing operation extends vertically downwards from the guide roller on its side facing the slides, and is adapted to be pivoted downwardly through 90° into the horizontal, inactive position in order to clear the path of the slider leading to the cake discharge point of the machine.

In known packing machines it has been customary to provide means for the correction of cake weight; it has been usual, for example, in machines for moulding and packing cakes of butter to make sure that the desired weight of the cake was maintained. In the case of reciprocating cake moulds this could only be obtained by scraping off more or less material or by varying the level of the cake stamping die; however, all known steps serving this end proved to be practically of no use, either due to lack of precision or to the complexity of design. The present invention solves the problem by providing a vertically adjustable bottom wall of the mould, whereas the front or back walls of the mould, disposed in the direction of movement of the mould, are vertically movable, so that the bottom wall entering more or less deeply into the mould is allowed to slip away under the front or back wall as the mould moves.

Further, it has been usual with this type of machines to employ sheet material wound up on supply rolls for the packing of cakes, the packing material being drawn off the roll and cut to the desired size of the wrapping sheet by means of a cutting device. When the machine is used for packing cakes of different size, these cakes do not necessarily always come to rest at an accurately determined point, which means that the sheet cut to size may not be available at the proper position at any given time. According to the present invention, this problem is advantageously solved by using perforated sheet material to allow a single sheet to be disconnected from the feed roll when the cake has reached a predetermined position, so that no cutting device will be required.

Figure 6A:
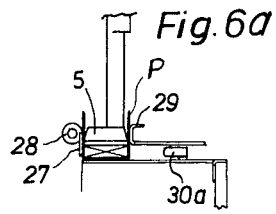
Figure 3A:
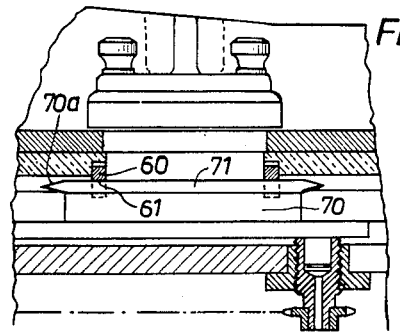
Figure 6B:
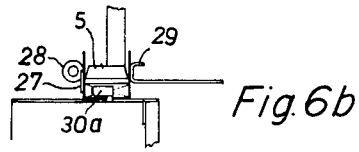
Figure 6C:
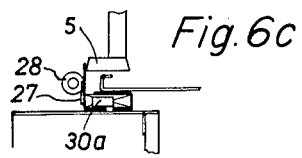
Figure 4:
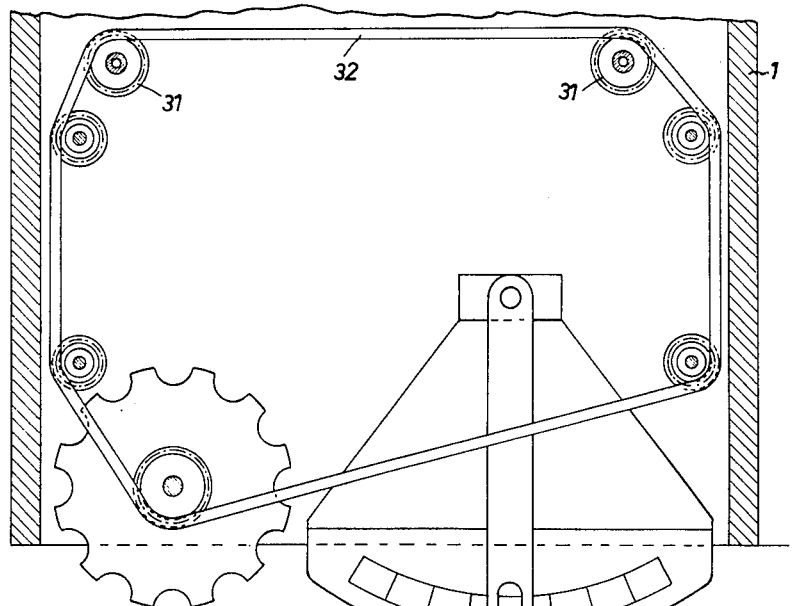
Figure 7:
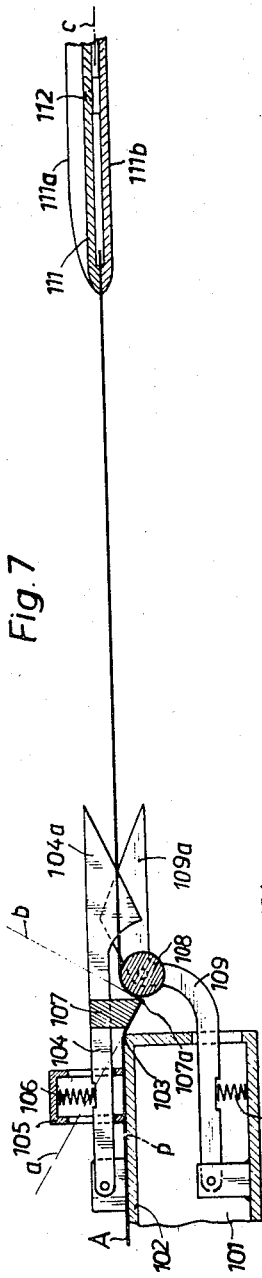
Figure 8:
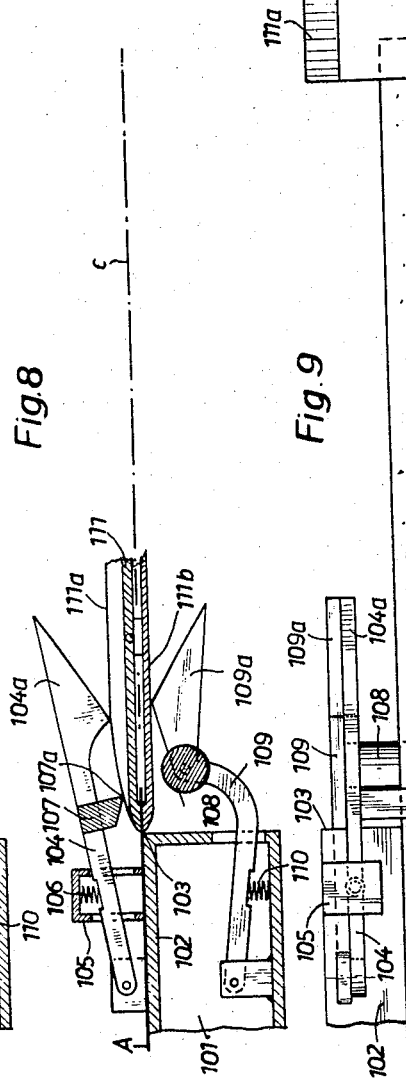
Figure 9:
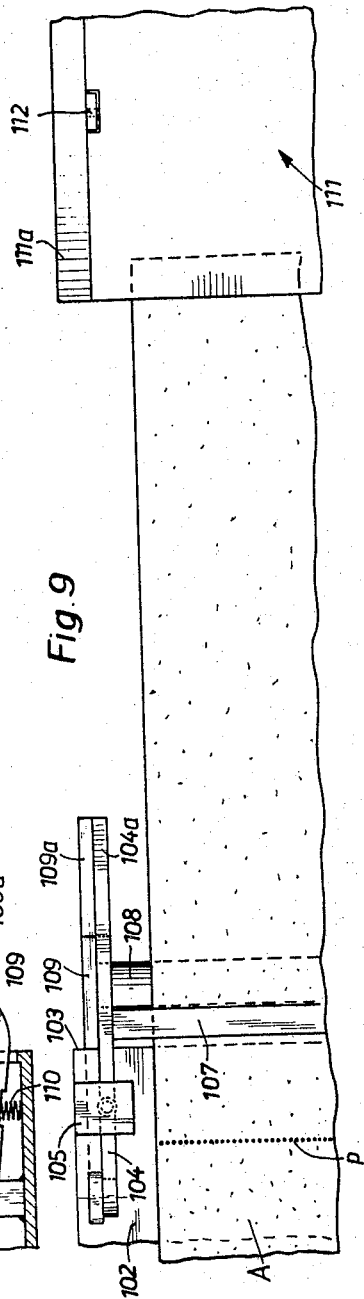

An embodiment of the machine according to the present invention is illustrated in the accompanying drawings, in which FIGURE 1 is a vertical sectional view of the cake moulding and packing device of the machine, FIGURE 2 shows a cross sectional view of a detail of the machine of FIGURE 1 drawn to a larger scale, FIGURE 2a shows a modification of the detail of FIGURE 2, FIGURE 3 is a vertical longitudinal section of the detail of FIGURE 2, FIGURE 3a is a section similar to FIGURE 3 of the modification of FIGURE 2a, FIGURE 4 is a horizontal section showing the adjusting means provided in the mould bottom, FIGURE 5 is a plan view of the machine, FIGURE 6 shows a modification of a detail of FIGURE 1 represented in three different positions of operation, FIGURE 6a, FIGURE 6b and FIGURE 6c, FIGURE 7 is a vertical longitudinal section of a modification of the paper feeding device, before a line of perforation provided in the web drawn off the supply roll—not shown in the drawing—by gripping means, has passed the edge of a severing beam, FIGURE 8 is a vertical longitudinal section corresponding to FIGURE 7 showing the severing device opened by the gripping means as the latter holds the end of the web, FIGURE 9 is a plan view of a part of the device of FIGURE 7.

In the drawing, numeral 1 refers to a machine base carrying a motor and gear box. The operating mechanisms of the machine above the motor and gear case are arranged on three superposed levels, with an upper level supporting a moulding device A, an intermediate level at which is situated a paper feeding device B and a lower level receiving a packing device C (FIG. 1). Under a feed hopper 2 having a discharge opening 3, the moulding device comprises a reciprocating moulding box 4 associated with a pressing die 5. In addition to stationary side walls and front and back walls 6 whose movement is vertically limited, the moulding box 4 has a vertically adjustable bottom 7. The bottom 7 protruding between the side walls is provided at both ends with ramps 7a, whereas the front and back walls 6, as best seen in FIGS. 2 and 3, are guided in grooves 6a of the side walls and arranged so as to overlap the bottom 7 in a straddling position. The moulding box 4 (with the exception of bottom 7) is adapted to be moved to-and-fro in the direction of arrow *a* (FIGS. 3 and 5). The vertical limitation of movement of walls 6 is obtained by means of screw bolts 6*b* engaging in recesses 6*c* provided in the front surfaces of walls 6 (FIG. 2).

The paper feeding device B is arranged, as mentioned, under the moulding device A. The paper feeding device has a supply roll 8 from which sheet material 8*a* is drawn off horizontally and transversely of the direction of movement *a* of the mould box 4. The movement of the supply roll 8 can be checked by means of a brake band 9 made of leather. One end of the brake band 9 is stationary, whereas the other end is fixed to a brake flap 10 whose one end carries a braking roller 11 and whose other end supports a downwardly extending release member 12. The brake flap 10 is preceded by a paper holding 13 whose jaws have a rectangular toothing. The paper feed path crosses the displacement path of the moulding box below a point where the moulded cakes are discharged. On the side of the discharge point remote of the paper holder 13 and in the position shown in FIGS. 1 and 5, there is a paper beak 14 the lower half of which is rigidly secured to a frame reciprocating along the paper feed path, whereas the upper half of the beak is pivotally supported and carries a spring leaf on its front end. As shown particularly in FIGURE 5, the two front portions of the beak (at the top and at the bottom) are provided with teeth complementary to the rectangular teeth of the paper holder 13, so that they engage with their projections into the gaps of the paper holder. The upper half of the beak, pivotally supported at 15 carries, behind its point of support, on its top a stop member 16 and is adapted to be fixed on its rear end in either of two different positions of pivoting movement by means of a snapping device 17 which includes a spring-loaded ball. Above the horizontal path of movement of the paper beak 14 extending from the end position shown in FIGS. 1 and 5 to the paper holder 13, a tappet roller 18 is provided for cooperation with the cam 16, the tappet roller being adjustable in the direction of the beak travel; a correspondingly arranged, but stationary tappet roller 19 is located within the area of the paper holder 13 and is designed for cooperation with the front portion of the pivoting upper half of paper beak 14. Under the paper feed path a brake-operating lever 20 is pivotally supported and adapted to be checked in two swinging positions on its end facing the paper holder 13 by means of a snapping device 21 having a spring-loaded ball. On the front side of its swivel support the brake-operating lever 20 carries a stationary tappet roller 22 and another tappet roller 23 on the other side, the tappet roller 23 being adjustable in the longitudinal direction of the lever. The two tappet rollers 22, 23 are designed for cooperation with a lug cam 24 provided on the lower half of paper beak 14.

The packing device C arranged, as mentioned, under the paper feed path, has a slider 25 reciprocating parallel to the paper feed path and includes a receiver box 26 for the cakes to be packed. In the operating position of box 26 as shown in FIG. 1 the front wall thereof is formed of a pivoting blade 27 protruding downwardly and tangentially from a roller 28 the rotating position of which can be adjusted; roller 28 is adapted to be rotated from the position as shown in FIG. 1 through 90° in clockwise direction so that the blade comes to rest horizontally. The slider 25 carries an upper metal folding member 29 movable relatively to the slider box in the longitudinal direction of the slider travel. The slider 25 is adapted for movement between folding curves 30 to a delivery point for the ready-packed cakes.

The mode of operation of the machine is as follows: As the operation starts, mould 4 is located underneath the discharge opening 3 of hopper 2. The bottom 7 of the mould, which is mounted on a setting plate 7*d* whose journal pins 7*b* are supported in threaded bushes 7*c*, vertically adjustable by means of a hand lever 33 (FIG. 4), chain 32 and chain wheels 31, is adjusted so that the volume of the mould will produce the desired weight of the cake. Now the mould is filled by pressing down the die 5, whereupon the filled mould is moved in the direction of arrow *a* and brought above the point where the mould path crosses the paper feed path. Meanwhile the open paper beak 14 has been moved from the position shown in FIGS. 1 and 5 towards the paper holder 13. Thereby the free end of the paper web is flush with the front edge of the paper holder and located between the jaws of the holder.

As soon as the teeth of the beak 14 engage with those of the paper holder 13, the upper half of the beak will be tilted by the tappet roller 19 into the closed position and locked in this position by the snapping device 17. In this stage, the brake of the supply roll and the paper web is in a released position owing to the fact that the front arm of the lever 20 is secured in its lower end position by the snapping device 21, thus keeping the braking roller 11 in a lifted position, while at the same time the brake band 9 is released. Now the paper beak 14 returns into the position shown in the drawings which causes sheet material to be drawn off the supply roll 8. This sheet material 8*a* is perforated at intervals determined by the size of the cake to be packed. The upper tappet roller 23 is adjusted in such a manner that the stop 24, as it meets the roller, tilts the lever 20 into the swivelling position in clockwise direction in FIG. 1 corresponding to the braking position of the braking roller 11 or the brake band 9, as soon as the first perforation, as seen from the end of the paper web, comes to rest exactly against the front edge of the paper holder 13. Since the motion of the paper web is new checked, the front paper section will be severed along the perforation as the paper beak continues to travel back. The severed sheet will be carried along by the beak 14 until the sheet is exactly positioned under the filled mould. At this moment, the stop 16 meets the correspondingly adjusted tappet roller 18 and tilts the upper beak half again into the open position secured by snapping device 17. Thereby the paper sheet is released and left in the proper position under the mould, whereas the open beak 14 is caused to return to its rearmost position. In the meantime, slide box 26 was caused to move into the position beneath the mould 4. Now the die 5 starts pressing the cake down through mould 4 into the slide box 26 carrying along at the same time the paper sheet previously disposed under the mould. To make sure that the cake reaches the slide box 26 smoothly and without being damaged along its edges, the blade 27 is caused to pivot into its lower horizontal position, so that the laterally open slide box will be open on its front too; only after the cake is located in the slide box, will the blade 27 be moved into the vertical closing position as shown in FIG. 1. By pushing forward the metal sheet 29, first the rear upper flap of the paper sheet enclosing the cake in U-shaped manner is folded upon the cake, whereupon the slider 25 is moved towards the cake delivery point, whereas the blade 27 is pivoted at the same time into its lower horizontal position. In moving towards the delivery point, the slide box passes the folding curves 30 folding the side flaps of the paper sheet in a known manner against the cake, after the roller 28 has folded back the front upper flaps of the sheet. After the ready-packed cake has been ejected, the slider returns to the starting position. As it is travelling back, a new cake is about to be formed and a new paper sheet made ready for use, so that the next packing operation is allowed to follow immediately.

In the embodiment as described above the walls 6 of the mould 4 are free to move vertically in the grooves 6*a* and therefore they are loosely resting on the bottom 7. As long as the vertically adjustable bottom 7 of the mould 4 is not situated in its upper end position, a certain clearance exists between the walls 6 and the upper limit of grooves 6*a* in the mould. As the mould is filled the pressure of die 5 causes the kneadable matter to pass under the walls 6 and to lift the latter. In order to prevent any matter from emerging laterally, the walls 60 in the modification shown in FIGURES 2a and 3a are provided with guide grooves 61 engaging with edge portions 71 of the bottom 70 of mould 4. Consequently, the walls 60 will be carried along correspondingly as the bottom 70 is vertically adjusted. In this case, the bottom 70 is provided on its front surfaces with wedge-shaped ramps 70a which make it easier for the bottom to enter the guide grooves of the walls 60. In the machine as described the die 5 is lifted immediately after the cake material has been pressed into the mould 4. The paper sheet pressed down with the material is of U-shape shown in FIG. 1 at P. It may happen that the die 5 sticks to the kneadable material in such a manner that the cake and the paper sheet may possibly be lifted together with the die which necessarily will cause a breakdown of operation. This disadvantage is avoided in the modification shown in FIGURE 6. In this embodiment the paper sheet P also assumes U-shape after it has been pressed down by the die 5 (FIG. 6a). However, before the die 5 is again lifted upwardly, two laterally arranged slides 30a for preliminary packing are advanced so far that these slides fold the laterally projecting rear paper flaps forwardly over the cake (FIG. 6b), which makes it possible, on the one hand, to obtain a better adhesion of the cake to the paper and, on the other hand, to keep the preliminarily packed cake stationary by means of the slides 30a; it is, therefore, impossible for the cake to be carried along with the die 5 as the latter is subsequently lifted. After the die 5 has been moved upwardly, the folder sheet 29 will be advanced as described above, whereupon the folding of the paper sheet is finished by the folding curves 30 in the manner also described above.

The machine as specified above can be used for the production of cakes of various sizes, e.g., for the production of the butter cakes weighing 50, 100, 200 and 500 grams. For this, the mould 4, slider box 26, the folding bends 30 and the paper feed roll may be exchanged and the tappet rollers 18 and 23 of the paper feeding device are adjustable. Of course, the mould and sliding box may also be used for producing and packing several cakes at the same time (such as butter portions weighing 20 grams). The adaptability is an essential advantage of the machine as specified.

It is understood that all the working movements of the various parts are positively controlled and derived from a common drive.

As can be easily seen, the particular manner of paper supply, as described, together with the exchangeability of the mould, the sliding box and the folding curves, allow a variety of uses of the machine. It is possible to apply this type of paper feeding device and the interchangeability of certain parts thereof to machines whose sliding box has a member, such as a pivoting front wall, arranged thereon (instead of the stationary pivoting blade) or a sliding box which has means other than those described in order to control the weight of the cake (a mould bottom whose level is adjustable).

Instead of the paper feeding device as described above a mechanism as shown in FIGURES 7 to 9 may be provided.

In the figures, numeral 101 refers to a section of the machine base having a delivery table 102. The horizontal upper surface of the table ends on the side remote of the supply roll, not shown in the drawing, in a not very sharp delivery edge 103 which, e.g., may be polished. On each of the longitudinal edges of the table 102 a supporting lever 104 is mounted for pivoting movement in a vertical plane. The levers 104 in operating position, as shown in FIGURE 7, extend horizontally in the longitudinal direction of the table 102 beyond the delivery edge 103 thereof, and through a spring housing 105 arranged on the table 102 where they are loaded by a spring 106 pressing the lever downwardly. The lower lateral wall portions of the spring housing 105 serve both to limit the openings for the passage of the lever 104 and as a stop for the limitation of the downward movement of the lever. Immediately in front of the delivery edge 103 of table 102 a severing beam 107 is fixed to the supporting levers, which beam has a wedge-shaped operating end portion reaching below the delivery edge 103 when in its operating position as seen in FIGURE 7. The wedge surface of the severing beam 107 facing the table 102 or the section 101 of the machine base is located on a level substantially aligned with the delivery edge 103 when the severing beam is in operating position. Parallel to the beam 107 the latter is preceded by a guide roller 108 carried by two supporting levers 109 which are mounted laterally in the base section 101 for pivoting movement in a vertical plane. Each of the supporting levers 109 is loaded by a pressure spring 110 supported on the base section 101; these pressure springs tend to keep the levers 109 and the guide roller 108 supported by the levers in the operating position shown in FIGURE 7. In this position the upper surface of guide roller 108 is substantially aligned with the horizontal table level, whereas the wedge 107a of the severing beam 107 is nearly in contact with the guide roller 108 slightly above the axis thereof. The gap possibly existing between guide roller 108 and edge 107a should conveniently be of the order of 0.3 mm. at most. The angle of wedge of the separating beam 107 should advantageously be of 45° or less, the arrangement being conveniently such that, on the one hand, the angle between the planes $a$ and $b$ intersecting at the edge 107a and tangential to the delivery edge 103 and to the guide roller 108, is of the order of 90°, and that, on the other hand, the angle between the plane $a$ and the table plane is about of the same order as the angle between the horizontal plane $c$, in which the sheet is drawn off the supply roll, and the tangent plane $b$, this angle being between 30° and 60°. The two pairs of levers 104 and 109 arranged on either side of the table are located immediately side-by-side as seen from above (FIG. 9) and they have each an extension 104a and 109a, respectively. These lever extensions 104a and 109a overlapping in the form of scissors have each an inclined surface for cooperation with corresponding cam surfaces 111a and 111b, respectively, on the longitudinal surfaces of a beak type gripper 111. The gripper 111 has a lower stationary jaw and an upper jaw adapted to swing about a pin 112. The means—not shown in the drawings—for opening and closing the gripper 111 according to its position of travel are arranged on the machine base; the gripper 111 is conveniently provided with a snapping mechanism retaining the upper jaw in the position into which it has been pivoted during its forward and backward stroke by the said actuating means in the form of inclined cam surfaces. The actuating means for opening the gripper are adjustable along the gripper in such a way that the point, where the sheet delivered by the gripper and severed from the web has been released, is adjusted correspondingly; this is necessary, whenever articles of different size are to be wrapped in sheets of a correspondingly different size by packing machines, as the supply station (e.g., the feed hopper of the machine shown in FIGS. 1 to 6) always serves the same consumer station. Thus it is understood that the centre of the sheets to be fed must always be situated at the same point, consequently, a shorter sheet must be released earlier by the gripper than a longer sheet.

The mode of operation of the feeding device described above is as follows: Prior to putting the device into operation, web A perforated at $p$ at equal intervals corresponding to the desired length of the sheet, is fed from the supply roll onto the delivery table 102 in such a manner that the free end of the web, as shown in FIGURE 8, slightly protrudes beyond the delivery edge 103 of the table 102. The severing beam 107 and guide roller 108 are not yet located in their operating positions, whereas the gripper 111 is in its right-hand end position, as seen in the drawing. When the machine is now put into operation the open gripper 111 moves to the left. As the cam surfaces 111a and 111b strike against the inclined surfaces of the scissors arms 104a, 109a of the levers 104 and 109, these levers are pressed apart so that the severing beam 107 and the guide roller 108 are pivoted into their inactive positions (FIG. 8) and thus clear the access of the gripper 111 to the projecting end of the web. As the opening gripper slides over the projecting web end, the upper portion of the gripper, by cooperation with the corresponding actuating cams, is pivoted into a closing position, so that the gripper 111 upon reaching its corresponding end position immediately in front of the delivery edge 103 of table 102, safely clamps the web end (FIG. 8). During the back stroke of the closed gripper 111 its cam surfaces 111a and 111b release the levers 104 and 109, so that the severing beam 107 and the guide roll 108 are pressed into their operating positions by the action of the springs 106 and 110. The web A drawn off the feed roll by the returning gripper 111 passes along the wedge surface of the beam 107 under the latter and over the guide roller 108. No permanent kink of the web will result from this; the fact is that owing to bending of the web in opposite direction around the smooth, slightly rounded edge 107a and around the guide roller 108 the piece of web running off the guide roller 108 will not reel in, even in the untensioned condition. During this backstroke of the gripper 111 (FIG. 7), the first perforation p from the end of the web slides over the delivery edge of the table and after it has passed the wedge surface of the severing beam 107, arrives at the edge 107a of the beam. At this point of the web which is weakened by the perforation, a permanent kink is necessarily produced through the pressure exerted upon the web by the edge 107a of the spring-loaded beam 107. This causes the web to stick to the edge 107a and owing to the fact that the undiminished tension from the returning gripper continues to act upon the web, the latter will be disconnected along the bent line of perforation. The sheet thus separated from the web is drawn by the gripper 111 off the guide roller 108 to the packing station. When the centre of the sheet is located exactly above the centre of the packing position, the gripper 111 moves over the correspondingly adjusted actuating means adapted to pivot the upper jaw of the gripper, so that the latter is opened. Thus the sheet will be released and left on the support provided there (not shown in the drawings), while the gripper continues to move to its end position. As the remaining web A has been severed exactly at the edge 107a of the severing beam 107 spaced from the delivery edge 103, it projects over a precisely determined distance beyond the delivery edge 103, so that the sheet can be easily collected by the gripper during the following forward stroke.

It results from the foregoing description that the transport and severing device for the packing material as described requires only one driven element (gripper 111); the reciprocating, stroke-controlled movement of the gripper positively produces its opening and closing, the movement of the severing beam into and out of its active position, and the severing of the sheets. This positive control ensures a reliable operation of the machine irrespective of the width of web and size of sheets used. Only the actuating means for the opening of the gripper must be adjusted when changing the length of the sheet. Experience has shown that the device makes possible a trouble-free operation even when, as may happen, the perforation of the sheet is defective; even in case the web is perforated only in part, the permanent kink will occur at the edge of the separating beam positively, causing the tearing of the sheet at the correct place. As the severing point is definitely determined by the position of the edge of the severing beam, even an inaccuracy in the intervals between the individual perforation lines of the web cannot prevent the remaining web from protruding beyond the delivery edge of the table always over the same distance. Thus, for each sequence of operation the same length of protruding sheet portion is offered to the gripper.

In the foregoing it has been assumed that the severing beam and the guide roller extend parallel to the delivery edge of the table. However, it is even possible to incline edge of the table under a small angle (from 2° to 5°) to the plane of the delivery edge. Thus a less abrupt, but none the less a reliable severing of the sheet can be obtained at the line of perforation.

In the embodiment just described the wedge surface of the severing beam, when the latter is in operating position, is located in the plane a defined by the delivery edge 103 and the edge 107a. However, it is possible to incline the wedge surface slightly to the plane a, i.e., to provide a smaller wedge angle, so that the web passes directly from the delivery edge to the edge 107a without contacting the wedge surface. The delivery edge of the table could also be formed by a roller. Experience has shown that the web drawn by the gripper off the feed roll to pass over the table, under the wedge-shaped severing beam and over the guide roller and to arrive eventually at the packing point, is positively severed only at the line of perforation after this latter has reached the edge of the beam. Thus it is ensured that the sheet conveyed by the gripper during each transport stroke to the packing position, has exactly the length predetermined by the perforations of the web, without requiring an exactly timed stopping of the web at the severing point, and, without having to actuate the separating beam from outside, as it is the case with prior known devices provided with a cutting knife. Moreover, it is ensured that, after a sheet has been severed, the portion of web protruding beyond the delivery edge of the table has always the same length, so as to allow the gripper to collect it during the next sequence of operation, since the edge of the severing beam effecting the separation causes the sheet to be severed always at exactly the same distance from the delivery edge of the table. The edge of the beam which allows the non-perforated web portions to pass unimpeded, produces a kink at the line of perforation of the web, which kink causes not only the sheet to be reliably severed under the tension produced by the gripper, but prevents also the perforation line and consequently the adjacent web portion from being pulled beyond the edge of the severing beam.

I claim:
1. A machine for producing and wrapping cakes of kneadable material comprising a frame, a mould in said frame, a pressing die cooperating with said mould, means for feeding said material into said mould, means for vertically discharging moulded cakes from said mould, means for horizontally feeding wrapping material to the discharge path of the moulded cakes, and wrapping means comprising a horizontally movable slider having a bottom wall and a back wall of a moulded cake receiving box, a rotatable guide roller fixed in said frame having a ledge extending tangentially therefrom forming the front wall of said receiving box, said ledge in its active position during the first wrapping operation extending vertically downwardly from said guide roller on its side facing said slider thereby forming the front wall of said box and upon rotation of said roller through 90° is pivoted into the horizontal inactive position to clear the slider path leading to the cake delivery point of the machine, said means for feeding wrapping material comprising means for feeding sheet material from a supply roll to the point of consumption designed for handling web material perforated at intervals corresponding to the desired length of the wrapping sheet, a delivery table serving as a support for the web from the supply roll and having a delivery edge, a horizontal severing beam in front of said edge and adapted to be moved upwardly from an operative position against spring action, said beam having a lower severing edge cooperating with a horizontal guide roller movable downwardly from its operative position against spring action, the upper surface of said roller being substantially aligned with the surface of said table, the severing edge of said beam situated adjacent said guide roller when in operative position and horizontally spaced from the delivery edge of said table beneath the plane formed by said table surface, a reciprocating gripper provided in the plane of said table surface and movable at right angles towards and away from said delivery edge, and means on said gripper for moving the beam and the guide roller into their inoperative positions, said gripper being arranged for gripping a free end of web protruding beyond the delivery edge and to pull it underneath the severing beam and over the guide roller to the point of consumption.

2. A machine according to claim 1, wherein the angle of the planes intersecting at the severing edge of said beam and being tangential to the delivery edge of the table and to the guide roller respectively, with the plane of the table and with the plane of the web leaving the roller, respectively, is between 30° and 60°.

3. A machine according to claim 2, wherein the severing beam and the guide roller are disposed each on a pair of levers arranged for pivoting movement in a vertical plane.

4. A machine according to claim 3, wherein the levers of the severing beam are pivotally supported on either side of the table on the top thereof, and wherein the levers have an extension provided with a lower inclined surface and protruding beyond the severing beam, while the levers of the guide roller pivotally supported underneath the table are provided with an extension protruding beyond the guide roller, each of the said lever extensions forming on either side of the table a pair of scissors arranged for cooperation with cam surfaces of the gripper.

5. A machine according to claim 1, wherein the severing beam and the guide roller are inclined at an acute angle with respect to the delivery edge of the table.

6. A machine according to claim 1, wherein the severing edge of the severing beam is substantially aligned with the axis of the guide roller and practically contacts the guide roller when the separating beam is in its operative position.

7. A machine for producing and wrapping cakes of kneadable material comprising a frame, a mould in said frame, a pressing die cooperating with said mould, means for feeding said material into said mould, means for vertically discharging moulded cakes from said mould, means for horizontally feeding wrapping material to the discharge path of the moulded cakes, wrapping means comprising a horizontally movable slider having a bottom wall and a back wall of a moulded cake receiving box, a rotatable guide roller fixed in said frame having a ledge extending tangentially therefrom forming the front wall of said receiving box, said ledge in its active position during the first wrapping operation extending vertically downwardly from said guide roller on its side facing said slider thereby forming the front wall of said box and upon rotation of said roller through 90° is pivoted into the horizontal inactive position to clear the slider path leading to the cake delivery point of the machine, said feeding means for wrapping material comprising braking means for a supply roll of a web of wrapping material, the latter being perforated at spaced intervals corresponding to the desired length of the individual wrapping sheets, a web material holder having rectangular teeth associated with said supply roll and a beak for reciprocating movement between an end position and said holder, the front portions of said beak having complementary rectangular teeth to engage with said rectangular teeth of the web material holder.

8. A machine according to claim 7, wherein stop members are provided on said beak, and stationary and adjustable tappet rollers are provided for cooperation with said stop members in order to open and close said beak, and to actuate and release said braking means.

9. A machine according to claim 8, wherein said beak comprises a stationary lower half and a pivoting upper half adapted to be locked in an open and in closed position by means of a snapping device, the toothed gripping portion of the latter half being formed by a spring leaf.

10. A machine according to claim 8, wherein said braking means comprises a pivotally supported actuating lever which is adapted to be locked by means of a snapping device in two tilting positions corresponding to the actuation and the release of said braking means, a stationary tappet roller for releasing said braking means and an adjustable tappet roller for actuating said braking means.

11. A machine for producing and wrapping cakes of kneadable material comprising a frame, a mold in said frame, a pressing die cooperating with said mould, means for feeding said material into said mould, means for vertically discharging moulded cakes from said mould, means for horizontally feeding wrapping material to the discharge path of the moulded cakes, wrapping means comprising a horizontally movable slider having a bottom wall and a back wall of a moulded cake receiving box, a rotatable guide roller fixed in said frame having a ledge extending tangentially therefrom forming the front wall of said receiving box, said ledge in its active position during the first wrapping operation extending vertically downwardly from said guide roller on its side facing said slider thereby forming the front wall of said box and upon rotation of said roller through 90° is pivoted into the horizontal inactive position to clear the slider path leading to the cake delivery point of the machine, said mould having front and back walls with limited vertical movement, side walls and a bottom wall projecting between said side walls supporting in a straddling position said front and back walls, and means for adjusting the level of said bottom wall, said side walls have grooves therein, the front and back walls of said mould being guided in said grooves and said bottom wall is provided with guide ramps for said front and back walls.

12. A machine according to claim 11, wherein said front and back walls of said mould are provided with guide grooves and said bottom wall is provided with wedge-shaped guide ramps forming edge portions cooperating with said guide grooves.

References Cited by the Examiner
UNITED STATES PATENTS

| | | | |
|---|---|---|---|
| 759,960 | 5/1904 | Baylor | 53—228 |
| 2,019,002 | 10/1935 | Drohmann et al. | 53—122 X |
| 2,611,224 | 9/1952 | Jensen | 53—51 |
| 2,729,042 | 1/1956 | Brook | 53—389 |
| 2,952,958 | 9/1960 | Theiler | 53—230 |
| 3,016,673 | 1/1962 | Parker | 53—389 X |

FRANK E. BAILEY, *Primary Examiner.*

TRAVIS S. McGEHEE, A. E. FOURNIER,
*Assistant Examiners.*